United States Patent
Kashihara

(10) Patent No.: US 10,120,273 B2
(45) Date of Patent: Nov. 6, 2018

(54) LIGHT SOURCE APPARATUS, IMAGE DISPLAY APPARATUS, AND OPTICAL UNIT

(71) Applicant: Sony Corporation, Tokyo (JP)

(72) Inventor: Yoshiki Kashihara, Aichi (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 14/453,794

(22) Filed: Aug. 7, 2014

(65) Prior Publication Data

US 2015/0049307 A1 Feb. 19, 2015

(30) Foreign Application Priority Data

Aug. 15, 2013 (JP) ................. 2013-168798

(51) Int. Cl.
  *G03B 21/20* (2006.01)
  *G02B 27/10* (2006.01)
  *G03B 33/06* (2006.01)
  *G02B 26/00* (2006.01)
  *G03B 33/12* (2006.01)

(52) U.S. Cl.
  CPC ..... *G03B 21/2073* (2013.01); *G02B 27/1046* (2013.01); *G03B 21/204* (2013.01); *G03B 21/208* (2013.01); *G03B 33/06* (2013.01); *G02B 26/008* (2013.01); *G03B 33/12* (2013.01)

(58) Field of Classification Search
  CPC .... G03B 22/06; G03B 21/2073; G03B 21/20; G02B 26/008; F21V 5/04; F21K 99/00
  USPC ................. 353/20, 31; 362/84, 362
  See application file for complete search history.

(56) References Cited

U.S. PATENT DOCUMENTS

| 8,192,050 B2 | 6/2012 | Ido et al. |
| 9,395,611 B2 | 7/2016 | Nishikawa et al. |
| 9,482,860 B2 | 11/2016 | Takamatsu |
| 2002/0149735 A1 | 10/2002 | Umehara et al. |

(Continued)

FOREIGN PATENT DOCUMENTS

| CN | 102155639 A | 8/2011 |
| CN | 102289077 A | 12/2011 |

(Continued)

OTHER PUBLICATIONS

U.S. Appl. No. 12/729,452, filed Mar. 23, 2010, Ido et al.

*Primary Examiner* — Steven H Whitesell Gordon
*Assistant Examiner* — Jerry Brooks
(74) *Attorney, Agent, or Firm* — Wolf, Greenfield & Sacks, P.C.

(57) ABSTRACT

A light source apparatus includes a light source unit and an output unit. The light source unit includes at least one solid-state light source capable of outputting light in a predetermined wavelength range as output light. The output unit includes a light emitter and a base unit. The light emitter is excited by the output light from the light source unit and emits visible light with a wavelength different from a wavelength of the output light. The base unit is rotatable about a predetermined rotation axis and contains a crystal-line member having a crystal axis direction set to a direction different from a direction orthogonal to an optical axis direction of the output light, the light emitter being supported in the optical axis direction. The output unit is capable of outputting combined light containing the light in the predetermined wavelength range and the visible light emitted from the light emitter.

16 Claims, 9 Drawing Sheets

(56) References Cited

U.S. PATENT DOCUMENTS

| | | | |
|---|---|---|---|
| 2010/0246174 A1 | 9/2010 | Ido et al. | |
| 2011/0199580 A1* | 8/2011 | Hirata | G03B 21/20 |
| | | | 353/31 |
| 2011/0310349 A1* | 12/2011 | Yanai | G02B 27/285 |
| | | | 353/20 |
| 2013/0107223 A1* | 5/2013 | Toyooka | G03B 21/16 |
| | | | 353/31 |
| 2014/0071683 A1* | 3/2014 | Hamada | G03B 33/06 |
| | | | 362/259 |
| 2014/0111775 A1 | 4/2014 | Nishikawa et al. | |
| 2014/0362350 A1 | 12/2014 | Takamatsu | |
| 2015/0277217 A1 | 10/2015 | Takamatsu et al. | |
| 2016/0282709 A1 | 9/2016 | Nishikawa et al. | |

FOREIGN PATENT DOCUMENTS

| | | |
|---|---|---|
| CN | 102650811 A | 8/2012 |
| JP | 11-337919 A2 | 12/1999 |
| JP | 2002-014419 A | 1/2002 |
| JP | 2004-083316 A | 3/2004 |
| JP | 2004-258221 A | 9/2004 |
| JP | 2011-164173 A | 8/2011 |
| JP | 2011-165555 A | 8/2011 |
| JP | 2012-003042 A | 1/2012 |
| JP | 2012-083695 A | 4/2012 |
| JP | 2012-137608 A | 7/2012 |
| JP | 2012-141411 A | 7/2012 |
| JP | 2012-173593 A | 9/2012 |
| WO | WO 2013/172025 A1 | 11/2013 |

\* cited by examiner

LIGHT SOURCE APPARATUS, IMAGE DISPLAY APPARATUS, AND OPTICAL UNIT

CROSS REFERENCE TO RELATED APPLICATIONS

This application claims the benefit of Japanese Priority Patent Application JP 2013-168798 filed Aug. 15, 2013, the entire contents of which are incorporated herein by reference.

BACKGROUND

The present disclosure relates to a light source apparatus, an image display apparatus, and an optical unit.

Recently, products including solid-state light sources such as a light-emitting diode (LED) and a laser diode (LD) have been increasingly used. The solid-state light sources are adopted as light sources used in projectors for presentation and digital cinema, instead of mercury lamps, xenon lamps, and the like used in related art. The fixed light sources such as LEDs have advantages such as having long lifetime, omitting the replacement of lamps, which is necessary in related art, and lighting-up immediately after power-on.

For example, Japanese Patent Application Laid-open No. 2012-173593 discloses a projector in which a solid-state light source is used as an excitation light source. Blue laser light output from the solid-state light source is applied to a phosphor wheel as excitation light. The phosphor wheel includes a base and a phosphor layer formed thereon. When the excitation light is applied to the phosphor layer, a yellow phosphor is emitted. The blue light and yellow light emitted from the phosphor layer are combined, and thus white light is emitted (Japanese Patent Application Laid-open No. 2012-173593, paragraphs [0028] and [0029], etc.).

In the projector disclosed in Japanese Patent Application Laid-open No. 2012-173593, in order to improve cooling performance of the phosphor wheel that generates heat by the application of the laser light, a crystalline member such as crystal and sapphire excellent in thermal conductivity is used for the base of the phosphor wheel. However, since this type of crystalline material has a crystal axis, when a phosphor wheel made of such a crystalline material is rotated, a relationship between the polarization direction of the laser light and the crystal axis direction of the crystalline member constantly changes. This leads to disturbances of the polarization direction of the laser light (Japanese Patent Application Laid-open No. 2012-173593, paragraphs [0005] and [0006], etc.). To eliminates such a disadvantage, in Japanese Patent Application Laid-open No. 2012-173593, the thickness of the crystalline member is defined within a predetermined range based on a complex index of refraction of the crystalline member or a wavelength of light output from a light source (Japanese Patent Application Laid-open No. 2012-173593, paragraphs [0009] and [0013], etc.).

SUMMARY

In the case where the crystalline material is used for the phosphor wheel as described above, there is a demand for a technique capable of suppressing disturbances of the polarization direction of the light coming from the solid-state light source.

In view of the circumstances as described above, it is desirable to provide a light source apparatus, an image display apparatus, and an optical unit that are capable of suppressing the occurrence of disturbances of a polarization direction of light coming from a light source, the disturbances being caused due to the use of a crystalline member.

According to an embodiment of the present disclosure, there is provided a light source apparatus including a light source unit and an output unit.

The light source unit includes at least one solid-state light source capable of outputting light in a predetermined wavelength range as output light.

The output unit includes a light emitter that is excited by the output light from the light source unit and emits visible light with a wavelength different from a wavelength of the output light, and a base unit rotatable about a predetermined rotation axis, the base unit containing a crystalline member having a crystal axis direction set to a direction different from a direction orthogonal to an optical axis direction of the output light, the light emitter being supported in the optical axis direction. The output unit is capable of outputting combined light containing the light in the predetermined wavelength range and the visible light emitted from the light emitter.

In the light source apparatus, the crystal axis direction of the crystalline member, in which the light emitter is supported, is set to a direction different from the direction orthogonal to the optical axis direction of the output light applied to the light emitter. This allows the occurrence of disturbances of a polarization direction of the output light to be suppressed also when the base unit containing the crystalline member rotates.

The crystal axis direction of the crystalline member may be set to a direction parallel to the optical axis direction.

This allows the disturbances of the polarization direction of the output light to be suppressed sufficiently.

The crystalline member may include a C surface in the direction orthogonal to the optical axis direction, the C surface being disposed as a surface to which the output light is input.

This allows the crystal axis direction of the crystalline member to be parallel to the optical axis direction and allows the disturbances of the polarization direction of the output light to be suppressed sufficiently.

The crystalline member may include an R surface in the direction orthogonal to the optical axis direction, the R surface being disposed as a surface to which the output light is input.

This allows the disturbances of the polarization direction of the output light to be suppressed also when the R surface of the crystalline member is disposed in the direction orthogonal to the optical axis direction.

The at least one solid-state light source may include a laser light source capable of outputting laser light as the output light.

The laser light source has high polarization property, and thus the suppression of disturbances of the polarization direction allows the combined light to be output at high efficiency, the combined light containing the light in the predetermined wavelength range and the visible light emitted from the light emitter.

The laser light source may be capable of outputting blue laser light.

The blue laser light has a short wavelength and high energy in the visible light. So, when the disturbances of the polarization property of the blue laser light are suppressed, the influence caused by the disturbances of the polarization, such as the deterioration of other members, can be suppressed.

The light source apparatus may further include an optical element capable of controlling a polarization direction of the combined light output from the output unit.

The output light contained in the combined light can be input to the optical element in the state where the disturbances of the polarization direction are suppressed. This allows the burden on the optical element to be mitigated.

The light source unit may be capable of outputting the output light having a first polarization direction. In this case, the optical element may include a splitting element configured to split the light having the first polarization direction and light having a second polarization direction orthogonal to the first polarization direction, and a conversion element configured to convert the light having the second polarization direction, the light having the second polarization direction being split by the splitting element, into the light having the first polarization direction.

The disturbances of the polarization direction of the output light having the first polarization direction are suppressed, and thus the amount of the output light, which is split by the splitting element as the light having the second polarization direction and whose polarization direction is converted by the conversion element, can be sufficiently suppressed. In other words, of the output light, the amount of the output light input to the conversion element can be sufficiently suppressed. As a result, the deterioration of the conversion element can be suppressed, and the lifetime of the light source apparatus can be prolonged.

The crystalline member may include one of crystal and sapphire.

The crystal is widely available in significant quantities and inexpensive among the crystalline members. This allows the light source apparatus to be achieved at low cost. Additionally, the sapphire has high thermal conductivity among the crystalline materials. This allows the light source apparatus to be achieved with high reliability.

According to another embodiment of the present disclosure, there is provided an image display apparatus including the light source apparatus described above, an image generation system, and a projection system.

The image generation system includes an image generation element configured to generate an image based on applied light, and a lighting optical system configured to apply the combined light output from the light source apparatus to the image generation element.

The projection system is configured to project the image generated by the image generation element.

This allows an image display apparatus with high efficiency and long lifetime to be achieved.

The lighting optical system of the image generation system may include an optical element capable of controlling a polarization direction of the combined light output from the light source apparatus.

The optical element capable of controlling the polarization direction of the combined light may be incorporated into the light source apparatus or disposed as a member different from the light source apparatus. Since the disturbances of the polarization direction of the output light contained in the combined light can be suppressed, the burden on the optical element can be mitigated.

According to another embodiment of the present disclosure, there is provided an optical unit including a light emitter, a base unit, and a lens unit.

The light emitter is excited by output light from at least one solid-state light source capable of outputting light in a predetermined wavelength range as output light and emits visible light with a wavelength different from a wavelength of the output light.

The base unit is rotatable about a predetermined rotation axis, the base unit containing a crystalline member having a crystal axis direction set to a direction different from a direction orthogonal to an optical axis direction of the output light, the light emitter being supported in the optical axis direction.

The lens unit is capable of outputting combined light containing the light in the predetermined wavelength range and the visible light emitted from the light emitter.

As described above, according to the present disclosure, it is possible to suppress the occurrence of disturbances of a polarization direction of light coming from a light source, the disturbances being caused due to the use of a crystalline member.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

[Image Display Apparatus]

Figure 1:
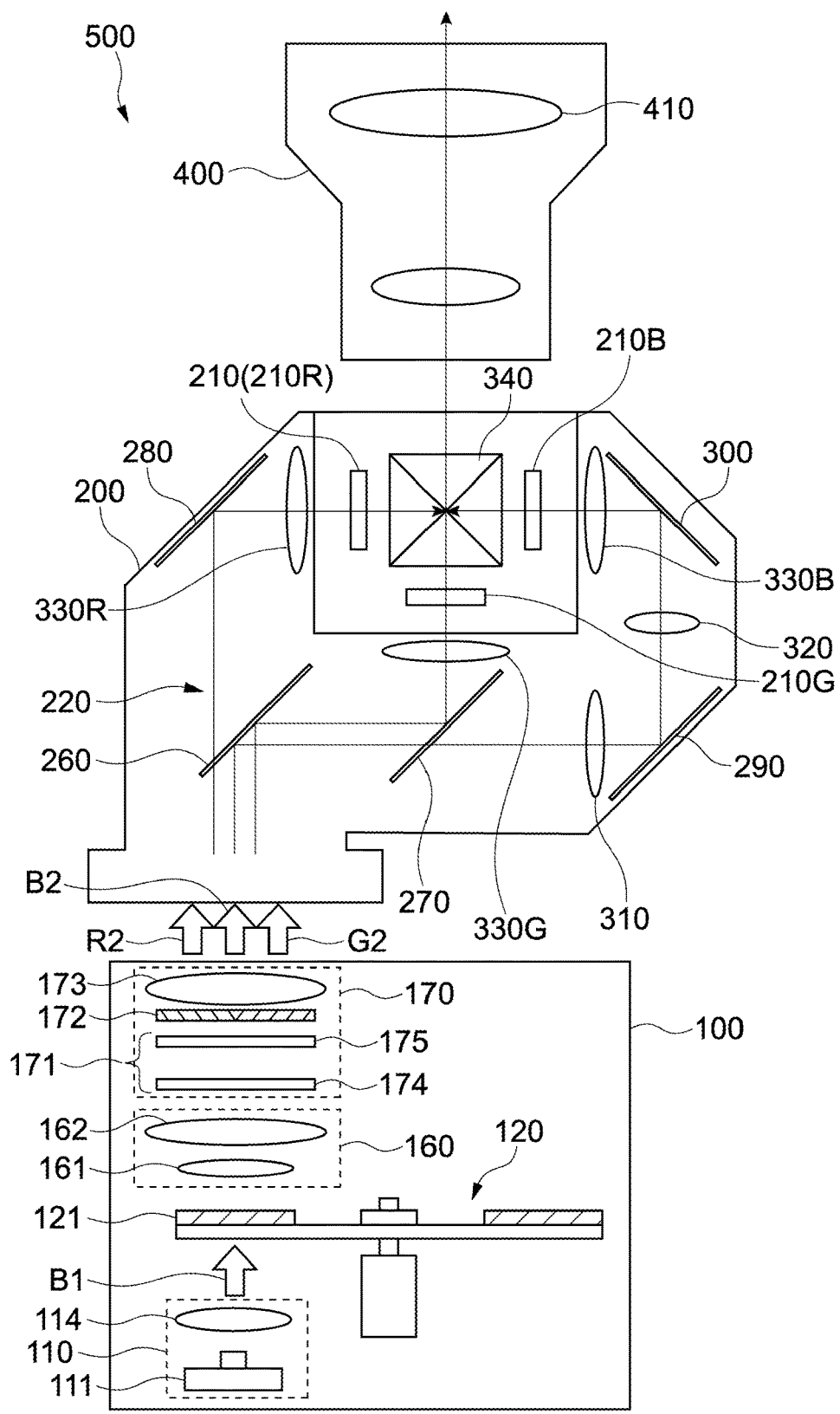
FIG. 1 is a schematic diagram showing a configuration example of an image display apparatus according to an embodiment of the present disclosure.

FIG. 1 is a schematic diagram showing a configuration example of an image display apparatus according to an embodiment of the present disclosure. An image display apparatus 500 is used as, for example, a projector for presentation or digital cinema. The present disclosure described below is also applicable to image display apparatuses used for various other purposes.

The image display apparatus 500 includes a light source apparatus 100 capable of outputting white light, an image generation system 200 that generates an image based on light from the light source apparatus 100, and a projection system 400 that projects the generated image on a screen (not shown) or the like.

The light source apparatus 100 combines laser light in a blue wavelength range with light in red and green wavelength ranges, the light in red and green wavelength ranges being generated from a phosphor substance excited by the laser light in the blue wavelength range, and outputs white light. The light source apparatus 100 includes a light collecting unit 110, a phosphor wheel 120, a lens unit 160, and an integrator optical system 170. Due to blue laser light B1 output from the light collecting unit 110, yellow light containing red light and green light is generated from a phosphor layer 121 of the phosphor wheel 120. Combined light (white light) containing blue laser light B2, which has passed through the phosphor layer 121, and green light G2 and red light R2 from the phosphor layer 121 is output to the image generation system 200 via the lens unit 160 and the integrator optical system 170. The light source apparatus 100 will be described later in detail.

The image generation system 200 includes an image generation element 210 that generates an image based on applied light, and a lighting optical system 220 that applies the white light coming from the light source apparatus 100 to the image generation element 210. The lighting optical system 220 includes dichroic mirrors 260 and 270, mirrors 280, 290, and 300, relay lenses 310 and 320, field lenses 330R, 330G, and 330B, liquid crystal light valves 210R, 210G, and 210B each serving as the image generation element, and a dichroic prism 340.

The dichroic mirrors 260 and 270 have property of selectively reflecting color light in a predetermined wavelength range and transmitting light in the other wavelength range. With reference to FIG. 1, for example, the dichroic mirror 260 selectively reflects green light G3 and blue light B3. The dichroic mirror 270 selectively reflects the green light G3 among the green light G3 and the blue light G3 having been reflected by the dichroic mirror 260. The remaining blue light B3 passes through the dichroic mirror 270. Thus, the light output from the light source apparatus 100 is split into a plurality of color light beams with different colors. It should be noted that the configuration for splitting the light into a plurality of color light beams with respective colors, a device to be used here, and the like are not limited.

The split red light R3 is reflected on the mirror 280, converted into parallel light by passing through the field lens 330R, and then input into the liquid crystal light valve 210R for modulation of red light. The green light G3 is converted into parallel light by passing through the field lens 330G and then input into the liquid crystal light valve 210G for modulation of green light. The blue light B3 passes through the relay lens 310 and is reflected on the mirror 290, and further passes through the relay lens 320 and is reflected on the mirror 300. The blue light B3 reflected on the mirror 300 is converted into parallel light by passing through the field lens 330B and then input into the liquid crystal light valve 210B for modulation of blue light.

The liquid crystal light valves 210R, 210G, and 210B are electrically connected to a signal source (for example, personal computer (PC)) (not shown) that supplies an image signal containing image information. The liquid crystal light valves 210R, 210G, and 210B modulate the input light for each pixel based on supplied image signals of the respective colors, and generate a red-color image, a green-color image, and a blue-color image, respectively. The modulated light of each color (formed image) is input into the dichroic prism 340 to be combined. The dichroic prism 340 superposes and combines the light beams of the respective colors that are input from the three directions, and then outputs the combined light toward the projection system 400.

The projection system 400 projects the image generated by the image generation element 210. The projection system 400 includes a plurality of lenses 410 and the like and applies the light combined by the dichroic prism 340 onto a screen (not shown) or the like. Thus, a full-color image is displayed.

Figure 2:
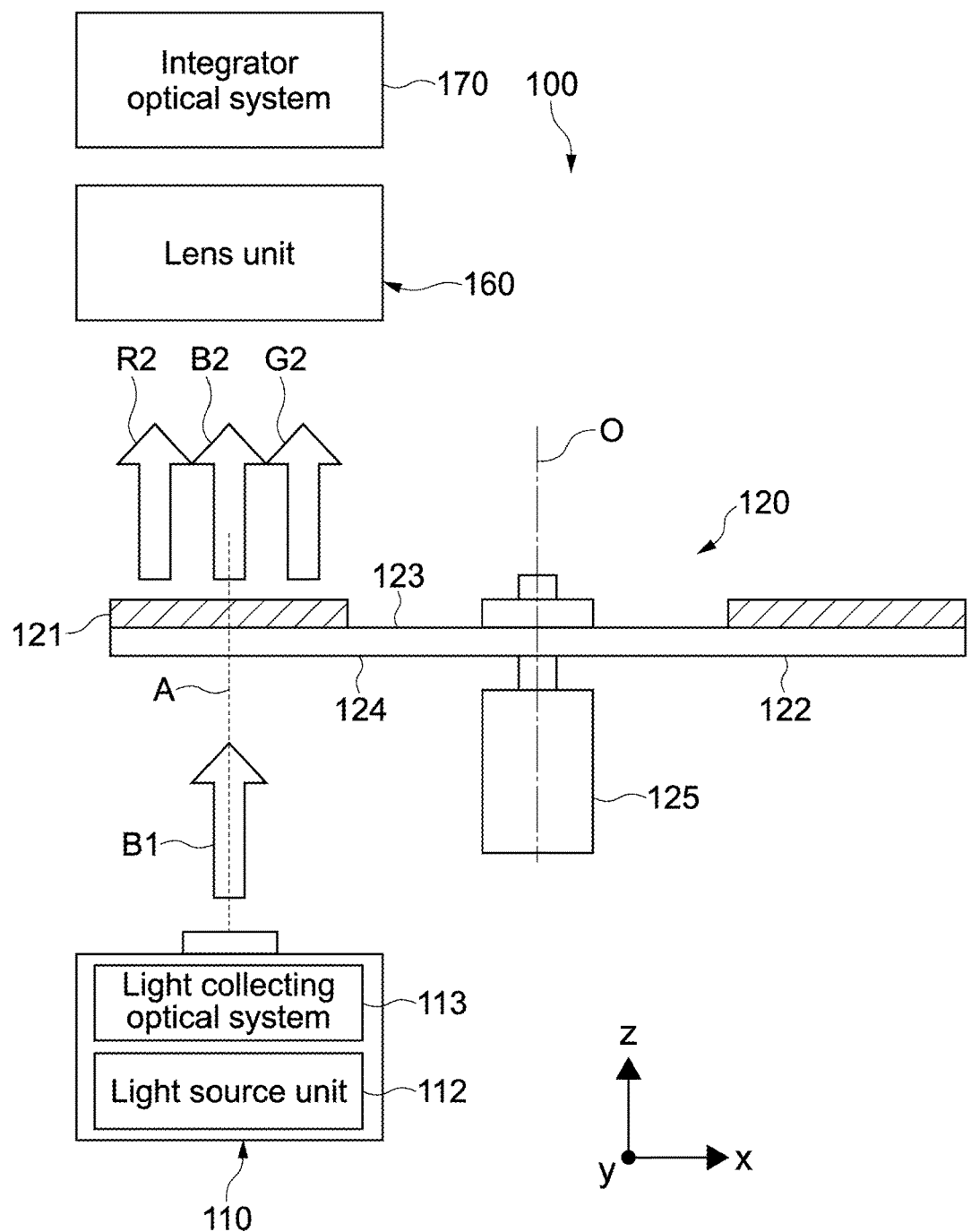
FIG. 2 is a schematic diagram showing a configuration example of a light source apparatus according to the embodiment.

FIG. 2 is a schematic diagram showing a configuration example of the light source apparatus 100 according to this embodiment. As described above, the light source apparatus 100 includes the light collecting unit 110, the phosphor wheel 120, the lens unit 160, and the integrator optical system 170. The light collecting unit 110 includes a light source unit 112 and a light collecting optical system 113. The light source unit 112 includes one or more laser light sources 111 (see FIG. 1) capable of outputting the blue laser light B1. The light collecting optical system 113 collects the blue laser light B1, which has been output from the light source unit 112, to a predetermined point on the phosphor layer 121. Those light source unit 112 and light collecting optical system 113 may be configured as one unit.

The one or more laser light sources 111 are blue laser light sources capable of oscillating the blue laser light B1 having a peak wavelength of an emission intensity within the wavelength range from 400 nm to 500 nm, for example. The one or more laser light sources 111 correspond to one or more solid-state light sources capable of outputting light in a predetermined wavelength range as output light. Other light sources such as a light-emitting diode (LED) may be used as the solid-state light source. Further, the light in the predetermined wavelength range is also not limited to the blue laser light.

To serve as the light source unit 112, a single laser light source 111 may be used, or a two-dimensional laser array light source (surface light source) in which the plurality of laser light sources 111 are two-dimensionally arranged may be used. In addition, the configuration of the light source unit 112 is not limited and may be designed optionally. As a matter of course, an optical member such as a collimator lens may be disposed in the light source unit 112.

For example, the light collecting optical system 113 includes a light collecting lens 114 (see FIG. 1) disposed on an optical path of the blue laser light B1. In the case where the plurality of laser light sources 111 are used, light collecting lenses are disposed so as to correspond to the respective laser light sources 111, and at the subsequent stage, one light collecting lens that is common for all of the laser light sources 111 is disposed. Such a configuration can be adopted, for example, but the present disclosure is not limited to this. The configuration of the light collecting optical system 113, a device to be used therefor, and the like may be optionally set.

The lens unit 160 functions as a collimator optical system to convert the white light (R2, G2, B2) coming from the phosphor wheel 120 into substantially parallel light. As shown in FIG. 1, the lens unit 160 of this embodiment includes a first lens 161 and a second lens 162. The first lens 161 suppresses the diffusion of the light coming from the phosphor wheel 120. The second lens 162 converts the light input from the first lens 161 into substantially parallel light.

Additionally, an optional configuration may be adopted. In this embodiment, the lens unit 160 and the phosphor wheel 120 form an output unit.

As shown in FIG. 1, the integrator optical system 170 includes an integrator element 171, a polarization conversion element 172, and a light collecting lens 173. The integrator element 171 includes a first fly-eye lens 174 and a second fly-eye lens 175. The first fly-eye lens 174 includes a plurality of microlenses two-dimensionally arranged. The second fly-eye lens 175 includes a plurality of microlenses that are arranged to correspond to the respective microlenses of the first fly-eye lens 174.

The white light that has been converted into substantially parallel light by the lens unit 160 is split into a plurality of light fluxes by the microlenses of the first fly-eye lens 174, and the plurality of light fluxes form images on the microlenses of the second fly-eye lens 175 that correspond to the respective microlenses of the first fly-eye lens 174. The microlenses of the second fly-eye lens 175 each function as a secondary light source and apply the plurality of light beams to the polarization conversion element 172 as incident light.

The integrator element 171 has a function of trimming the incident light, which is to be applied to the liquid crystal light valves 210R, 210G, and 210B, so as to have a uniform luminance distribution as a whole. The configuration of the integrator element 171 is not limited and may be designed as appropriate.

The polarization conversion element 172 has a function of equalizing polarization states of the incident light, which is input via the integrator element 171 and the like. In this embodiment, the white light containing the blue laser light B2 output from the light source unit 112 and the green light G2 and red light R2 output from the phosphor layer 121 is split into a plurality of split light beams by the integrator element 171. The split light beams are input to the polarization conversion element 172, and the polarization directions of the split light beams are made into one direction. A PS converter is used as the polarization conversion element 172, for example.

Figure 3:
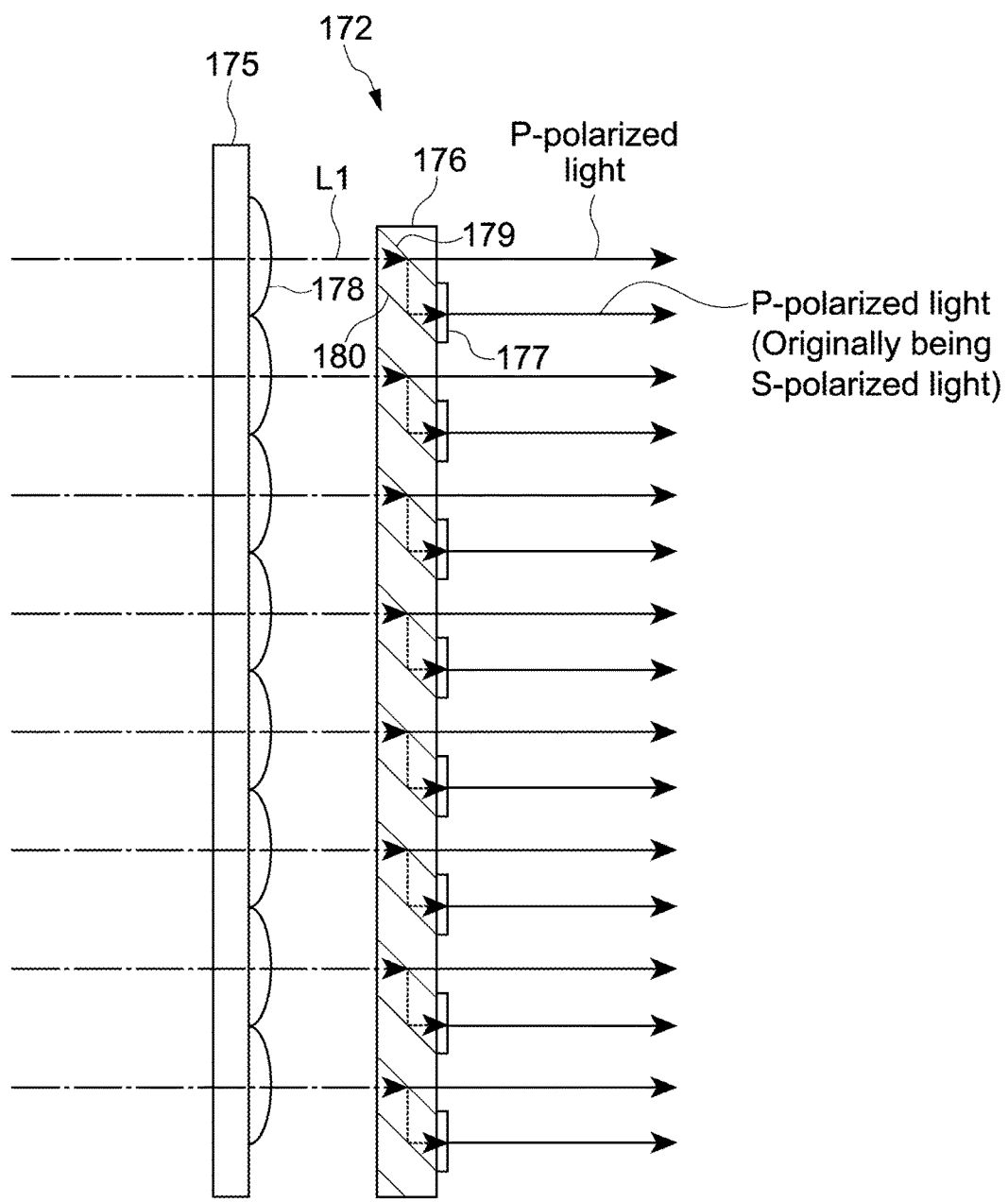
FIG. 3 is a schematic diagram showing a configuration example of a polarization conversion element according to the embodiment.

FIG. 3 is a schematic diagram showing a configuration example of the polarization conversion element 172. The polarization conversion element 172 includes a polarized light splitting element 176 and retardation plates 177. The polarized light splitting element 176 splits two light beams with different polarization directions, for example, P-polarized light and S-polarized light, which are contained in split light L1 that has been input to the polarization conversion element 172. Each of the retardation plates 177 converts the polarization direction of one of the two light beams with different polarization directions into the polarization direction of the other one of the two light beams with different polarization directions. The polarized light splitting element 176 includes polarized light splitting films 179 (hereinafter, referred to as polarized beam splitter (PBS) films) and mirrors 180. The polarized light splitting films 179 are provided to correspond to the microlenses 178 of the second fly-eye lens 175. As the retardation plate 177, a film made of an organic material is used, for example.

The split light L1 that has been input from the microlens 178 to the polarized light splitting element 176 is split into P-polarized light (P-polarized light for the PBS film 179) and S-polarized light (P-polarized light for the PBS film 179) by the PBS film 179. One polarized light of the P-polarized light and the S-polarized light, for example, S-polarized light, is reflected on the mirror 180 and then input to the retardation plate 177 provided to correspond to the microlens 178. The polarization state of the one polarized light, i.e., S-polarized light, which has been input to the retardation plate 177, is converted into the polarization state of the other polarized light, i.e., P-polarized light in this case, by the retardation plate 177, and is output in the same polarization state (P-polarized light in this case) as that of the other polarized light (P-polarized light) that has passed through the PBS film 179.

In this embodiment, the polarization conversion element 172 functions as an optical element that can control the polarization direction of the white light that has been output from the output unit (including the lens unit 160 and the phosphor wheel 120). Further, the P-polarized light described above corresponds to light having a first polarization direction, and the S-polarized light corresponds to light having a second polarization direction orthogonal to the first polarization direction. Further, the polarized light splitting films (PBS films) 179 function as a splitting element that splits light into the light having the first polarization direction and the light having the second polarization direction orthogonal to the first polarization direction. Furthermore, the retardation plates 177 function as a conversion element that converts the light having the second polarization direction, which has been split by the splitting element, into the light having the first polarization direction. The present disclosure is not limited thereto, and any other members and configurations may be adopted as the polarization conversion element 172.

The white light having a uniform polarization direction is output to the image generation system 200 via the light collecting lens 173.

The phosphor wheel 120 includes the phosphor layer 121 and a base unit 122 that supports the phosphor layer 121. The phosphor layer 121 corresponds to a light emitter that is excited by output light from the one or more laser light sources 111 and emits visible light with a wavelength different from that of the output light. In this embodiment, the phosphor layer 121 contains a phosphor substance that emits a phosphor by being excited by the blue laser light B1 having a center wavelength of about 445 nm. The phosphor layer 121 converts part of the blue laser light B1, which is output by the one or more laser light sources 111, into light in a wavelength range including a range from the red wavelength range to the green wavelength range (that is, yellow light) and then outputs the resultant light.

For example, a YAG (yttrium, aluminum, garnet)-based phosphor is used as the phosphor substance contained in the phosphor layer 121. It should be noted that the type of phosphor substance, a wavelength range of excited light, and a wavelength range of the visible light generated by excitation are not limited.

Further, since the phosphor layer 121 absorbs part of the excitation light and also transmits part of the excitation light, the phosphor layer 121 can also output the blue laser light B1 that has been output from the one or more laser light sources 111. Thus, the light output from the phosphor layer 121 is white light obtained by color combination of the blue excitation light and the yellow phosphor. In order to transmit part of the excitation light in such a manner, the phosphor layer 121 may contain filler particles serving as particulate substance having light transparency, for example.

The base unit 122 has a disk-like shape and has a support surface 123 that supports the phosphor layer 121 and a back surface 124 on the opposite side of the support surface 123. A motor 125 that drives the phosphor wheel 120 is connected to the center of the base unit 122. The motor 125 is disposed such that the normal line passing through the center of the base unit 122 is a rotation axis of the phosphor wheel 120. When the motor 125 is driven, the phosphor wheel 120 rotates about a rotation axis O. At that time, the base unit 122 also rotates about the rotation axis O. In other words, the base unit 122 is disposed rotatably about a predetermined rotation axis.

Since the direction of the rotation axis O is adjusted to the direction of the normal line of the base unit 122, a plane direction (x-y plane direction) of the support surface 123 and the back surface 124 and the direction of the rotation axis O are orthogonal to each other. On the other hand, the thickness direction of the base unit 122 and the direction of the rotation axis O are parallel to each other.

In this embodiment, the direction of an optical axis A of the blue laser light B1, which is output from the light source unit 112, and the direction of the rotation axis O are set to be parallel to each other. Thus, the optical axis direction of the blue laser light B1 and the plane direction of the support surface 123 and the back surface 124 are orthogonal to each other. Further, the optical axis direction of the blue laser light B1 and the thickness direction of the base unit 122 are parallel to each other. It should be noted that the rotation axis O is provided at a position different from the optical axis A such that a predetermined point of the phosphor layer 121 is located on the optical axis A.

As shown in FIG. 2, the phosphor wheel 120 is disposed such that the back surface 124 of the base unit 122 is directed to the light collecting unit 110. Further, the phosphor wheel 120 is disposed such that a focal position of the blue laser light B1, which is collected by the light collecting unit 110, matches a predetermined point of the phosphor layer 121. So, in this embodiment, the back surface 124 of the base unit 122 is used as an incident surface to which the blue laser light B1 is input. The blue laser light B1 output from the light source unit 112 is input to the back surface 124 of the base unit 122. The blue laser light B1 that has passed through the base unit 122 is applied to the predetermined point of the phosphor layer 121 supported by the support surface 123.

By the rotation of the base unit 122 by the motor 125, the one or more laser light sources 111 apply the excitation light to the phosphor layer 121 while relatively moving an application position on the phosphor layer 121. Thus, the white light containing the blue laser light B2, which has passed through the phosphor layer 121, and the green light G2 and the red light R2 serving as phosphors from the phosphor layer 121 is output as combined light by the phosphor wheel 120. The rotation of the phosphor wheel 120 allows avoidance of deterioration of the phosphor layer 121 due to the excitation light applied to a certain position of the phosphor layer 121 for a long period of time.

Figure 4A:
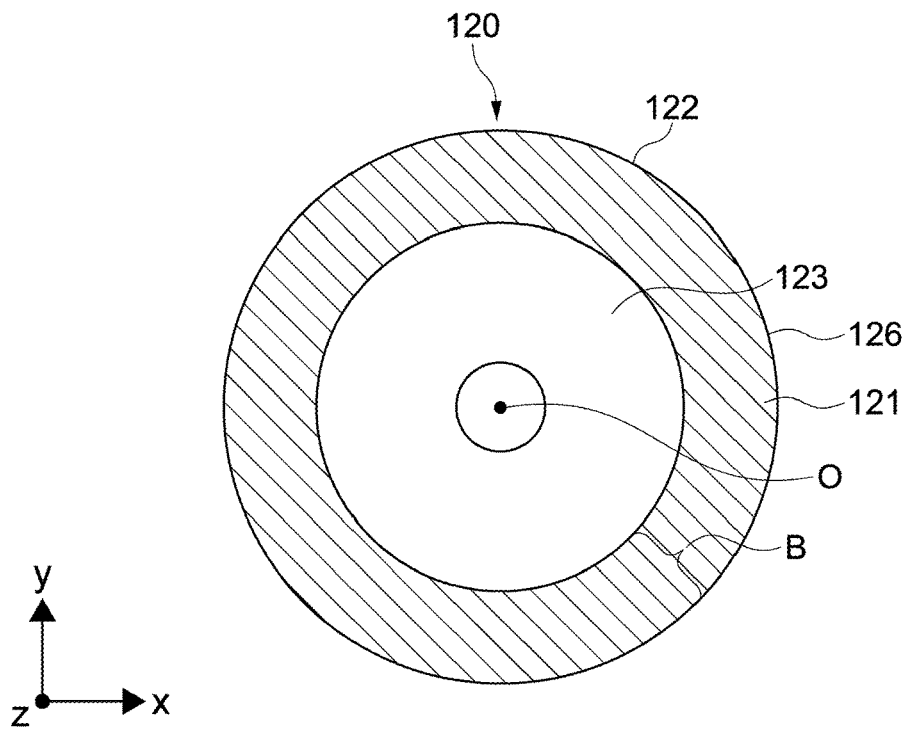
FIGS. 4A and 4B are schematic diagrams each showing a configuration example of a phosphor wheel according to the embodiment.
Figure 4B:
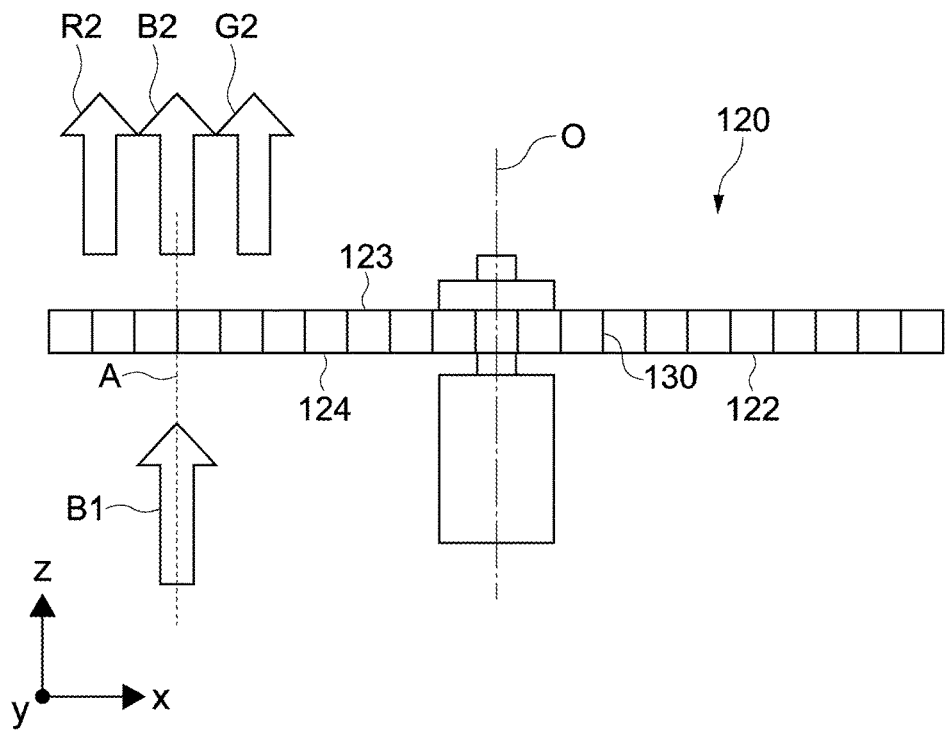

FIGS. 4A and 4B are schematic diagrams each showing a configuration example of the phosphor wheel 120. FIG. 4A is a plan view of the phosphor wheel 120 seen from an extending direction of the rotation axis O, that is, from the direction of the optical axis A of the blue laser light B1. Further, FIG. 4B is a side view of the phosphor wheel 120 seen from a direction orthogonal to the rotation axis O, that is, the plane direction (x-y plane direction) of the support surface 123 of the base unit 122. In FIG. 4B, the illustration of the phosphor layer 121 is omitted.

As shown in FIG. 4A, on the support surface 123 of the disk-shaped base unit 122, the phosphor layer 121 is formed centering on the rotation axis O. In this embodiment, the phosphor layer 121 is formed within a predetermined range B extending from an edge portion 126 of the support surface 123 toward the center. The blue laser light B1 output from the light source unit 112 is collected to a predetermined point of the phosphor layer 121 as excitation light.

For example, the circular phosphor wheel 120 has a diameter of 50 mm, and the phosphor layer 121 is formed in the range of about 10 mm extending from a position, which is about 15 mm away from the center of the phosphor wheel 120, toward the edge portion 126 of the base unit 122 in plan view. However, the range in which the phosphor layer 121 is formed is not limited, and the phosphor layer 121 may be formed in an optional range. For example, the phosphor layer 121 may be formed in a predetermined range extending from the center of the base unit 122 toward the edge portion 126. The point to which the blue laser light B1 is collected may also be optionally set as long as the point is set on the phosphor layer 121.

In this embodiment, the base unit 122 is made of a crystalline member having a crystal axis formed in a monolithic structure. Examples of such a crystalline member include crystal and sapphire that can transmit the blue laser light B1 as excitation light. Among the crystalline members, crystal is widely available in significant quantities and inexpensive. This allows the light source apparatus 100 to be achieved at low cost. Additionally, among the crystalline materials, sapphire has high thermal conductivity. This allows the light source apparatus 100 with high reliability to be achieved. Other crystalline members may also be used.

In FIG. 4B, the crystal axis of the base unit 122 made of a crystalline member is schematically expressed by a line 130. Hereinafter, the crystal axis will be referred to as a crystal axis 130. As shown in FIG. 4B, in this embodiment, the direction of the crystal axis 130 of the crystalline member is set to be parallel to the direction of the rotation axis O of the phosphor wheel 120.

Since the direction of the rotation axis O is parallel to the direction of the optical axis A of the blue laser light B1 output from the light source unit 112, it can be said that the direction of the crystal axis 130 is set to a direction parallel to the optical axis direction of the blue laser light B1. Further, from a different perspective, it can also be said that the direction of the crystal axis 130 is set to be parallel to the thickness direction of the base unit 122.

Figure 5:
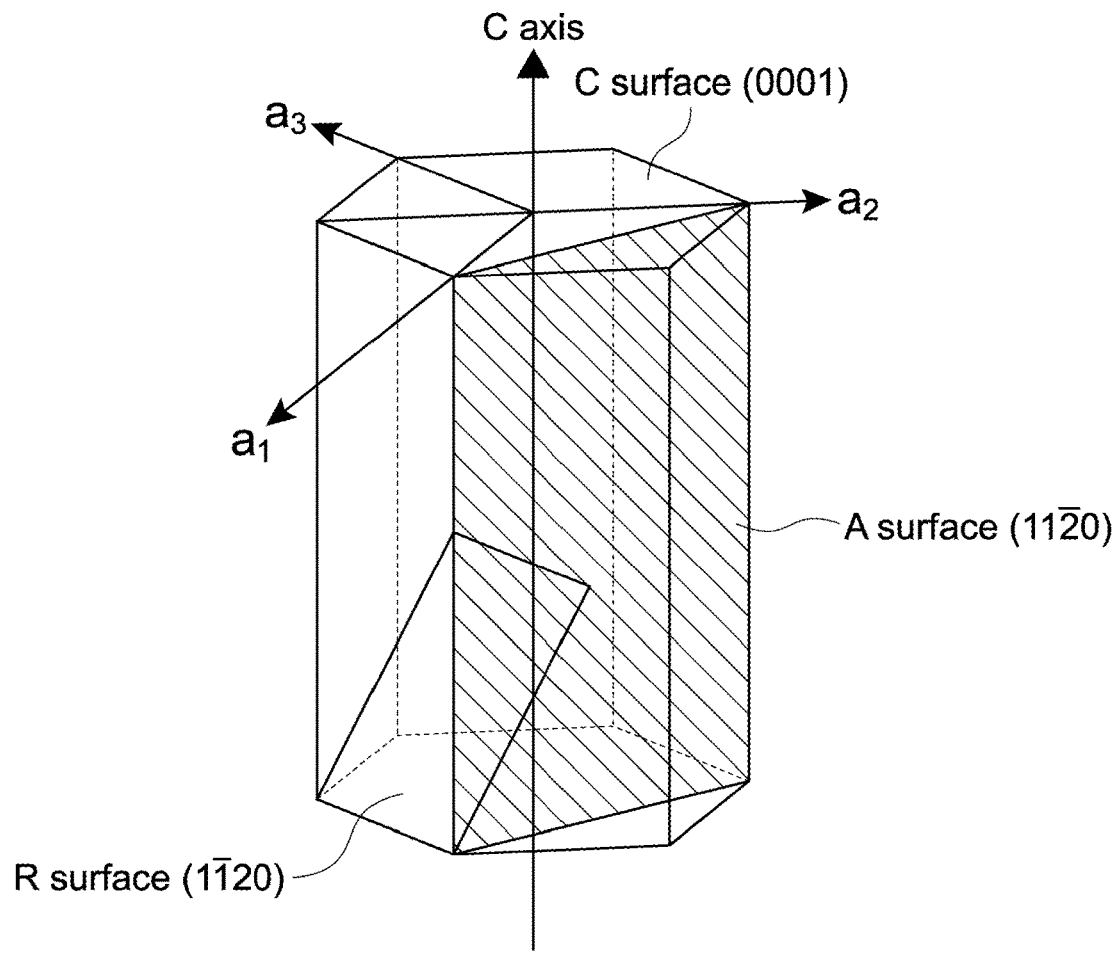
FIG. 5 is a perspective view for describing a representative plane orientation of single crystal sapphire.

The base unit 122 as described above can be easily prepared by, for example, using a substrate made of single crystal sapphire formed by so-called cutting on a C surface. FIG. 5 is a perspective view for describing representative plane orientations of the single crystal sapphire. Sapphire has a hexagonal system that has a C axis as a central axis and a C surface perpendicular to the C axis, the C surface being expressed by a Miller index (0001). A axes (a1, a2, a3) radially extending from the C axis and surfaces perpendicular to the respective A axes form an A surface (11-20). An R surface (1-102) forms a certain angle with the C axis as shown in FIG. 5.

The direction of the crystal axis is parallel to the C axis. So, in the sapphire substrate formed by cutting on the C surface, in which the C surface is a main surface, the direction of the crystal axis is parallel to the thickness direction of the substrate. In a sapphire substrate formed by cutting on an A surface, in which the A surface is a main surface, the direction of the crystal axis is orthogonal to the thickness direction and parallel to the plane direction of the substrate. In a sapphire substrate formed by cutting on an R surface, in which the R surface is a main surface, the direction of the crystal axis is set to have a certain angle formed with the thickness direction.

For example, the substrate made of single crystal sapphire formed by cutting on the C surface is disposed such that the two main surfaces are to be the support surface 123 and the back surface 124. This allows the base unit 122 shown in FIG. 4B to be achieved. In other words, the C surface is disposed in the direction orthogonal to the optical axis direction of the blue laser light B1 so as to serve as a surface to which the blue laser light B1 is input, and thus the direction of the crystal axis 130 can be set to be parallel to the optical axis direction. It should be noted that the present disclosure is not limited thereto, and a substrate made of a crystalline member formed by an optional method may be used as the base unit 122.

[Operation of Phosphor Wheel]

Figure 6A:
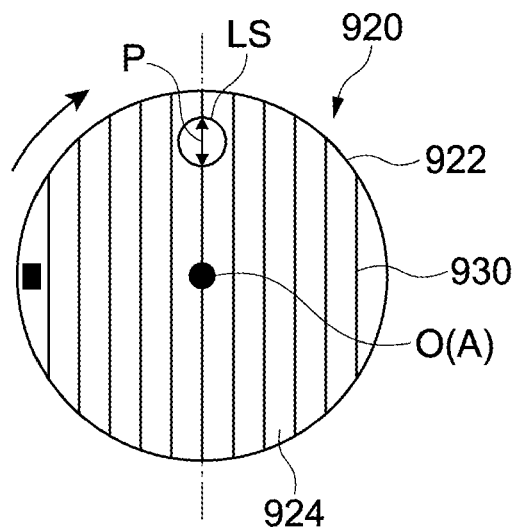
FIGS. 6A, 6B, and 6C are schematic diagrams each showing a configuration and an operation of a phosphor wheel as a comparative example.
Figure 6B:
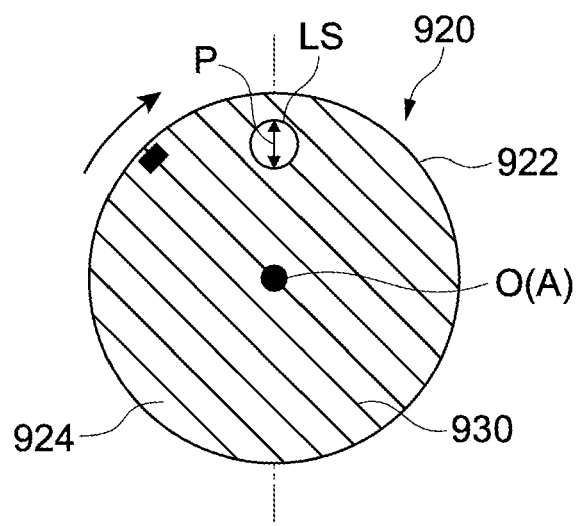
Figure 6C:
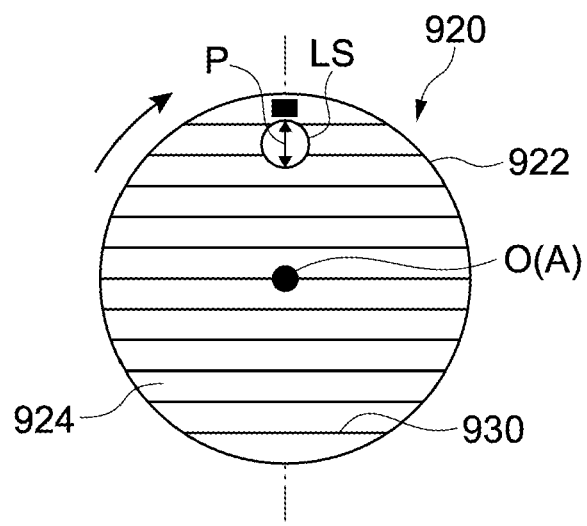

The operation of the phosphor wheel 120 according to this embodiment will be described. With reference to a comparative example, the operation of a phosphor wheel having another structure will be described. FIGS. 6A, 6B, and 6C are schematic diagrams each showing the configuration and operation of a phosphor wheel as a comparative example.

For a phosphor wheel 920 as a comparative example, a crystalline member whose direction of a crystal axis is set to a direction orthogonal to the direction of the rotation axis O, i.e., orthogonal to the direction of the optical axis A of the excitation light, is used as a base unit 922 that supports a phosphor layer. For example, the sapphire substrate formed by cutting on the A surface, in which the A surface is a main surface, is disposed such that the A surface is used as an incident surface of blue laser light.

To the base unit 922 described above, blue laser light B1 is output as excitation light from the light source unit 112. It is assumed that the blue laser light B1 is output in the state where the polarization direction is fixed. FIGS. 6A, 6B, and 6C show a polarizing axis P of the blue laser light B1 and a crystal axis 930.

With a predetermined point of a back surface 924 of the phosphor wheel 920 being set as a light application spot LS, the blue laser light B1 is applied thereto from the light source unit 112. During the application of the blue laser light B1 to the light application spot LS, the phosphor wheel 920 constantly rotates about the rotation axis O. When the phosphor wheel 920 rotates, the light application spot LS to which the blue laser light B1 is applied relatively moves about the rotation axis O. In other words, the light application spot LS moves in an arc on the back surface 924 of the base unit 922. The crystal axis 930 of the crystalline member to be the base unit 922 is set to be parallel to the plane direction of the base unit 922. So, when the base unit 922 rotates, the extending direction of the crystal axis 930 seen from the rotation axis direction also rotates. As a result, due to the rotation of the phosphor wheel 920, an angle θ formed by the polarizing axis P of the blue laser light B1 and the crystal axis 930 of the base unit 922 in the light application spot LS is sequentially changed.

For example, it is assumed that the phosphor wheel 920 rotates from the state shown in FIG. 6A to the state shown in FIG. 6C or from the state shown in FIG. 6C to the state shown in FIG. 6A. In the state shown in FIG. 6A, the angle θ formed by the polarizing axis P of the blue laser light B1 and the crystal axis 930 of the crystalline member is 0°. Further, in the state shown in FIG. 6C, the angle θ formed by the polarizing axis P of the blue laser light B1 and the crystal axis 930 of the crystalline member is 90°. In the state where the angle θ is any of 0° and 90°, the disturbances of the polarization direction of the blue laser light B1 that is input to the base unit 922 do not occur.

During the change from the state shown in FIG. 6A to the state shown in FIG. 6C or from the state shown in FIG. 6C to the state shown in FIG. 6A, however, the disturbances of the polarization direction of the blue laser light B1 that passes through the base unit 922 occur. The disturbances of the polarization direction become larger as the angle θ formed by the polarizing axis P and the crystal axis 930 shifts from any of 0° and 90°. As shown in FIG. 6B, when the angle θ is 45°, maximum disturbances of the polarization occur.

In such a manner, when the angle θ formed by the polarizing axis P of the blue laser light B1 and the crystal axis 930 of the crystalline member changes periodically, the level of the disturbances of the polarization direction also changes periodically. Specifically, in the case where the crystalline material has a monolithic structure, during one rotation, minimum disturbances of the polarization (no disturbances of the polarization) appear four times and maximum disturbances of the polarization appear four times.

The disturbances of the polarization direction of the blue laser light B1 adversely affect an optical system at a subsequent stage. For example, this becomes the burden on the polarization conversion element 172 for improving a light use efficiency described with reference to FIG. 3. Though being described above, the blue laser light B1 and phosphors containing the green light G2 and the red light R2 are combined and input to the polarized light splitting element 176 of the polarization conversion element 172. The green light G2 and the red light R2 generated from the phosphor layer 121 are light in a non-polarization state and thus appropriately split by the PBS film 179. The split S-polarized light is input to the retardation plate 177 and converted into P-polarized light.

On the other hand, the blue laser light B1 can be output with its polarization state being fixed, and thus the blue laser light B1 can be output as P-polarized light. So, the blue laser light B1 that has passed through the phosphor layer 121 passes through the PBS film 179 and is output as P-polarized light without change. In other words, the blue laser light B1 is not input to the retardation plate 177. However, when the disturbances of the polarization direction of the blue laser light B1 occur due to the rotation of the phosphor wheel 920, light that is split as S-polarized light by the PBS film 179 and input to the retardation plate 177 is generated from the blue laser light B1. In such a case, the amount of the light split by the PBS film 179 and the amount of the light that is input to the retardation plate 177 and whose polarization state is converted are increased. As a result, the deterioration of the PBS film 179 and the retardation plate 177 is advanced, and the lifetime of those members is shortened. In other words, the efficiency and the lifetime of the PBS film 179 and the retardation plate 177 are affected by the ratio of P-polarized light components and S-polarized light components of the light to be input. When the disturbances of the polarization direction of the blue laser light B1 output as P-polarized light occur, the ratio of the S-polarized light components is increased, and the performance of the PBS film 179 and the retardation plate 177 is lowered after a long period of use. In such a case, a light loss and the like at the time of the polarization conversion are caused, and thus there arises a problem that the light use efficiency of the image display apparatus 500 is lowered.

Figure 7A:
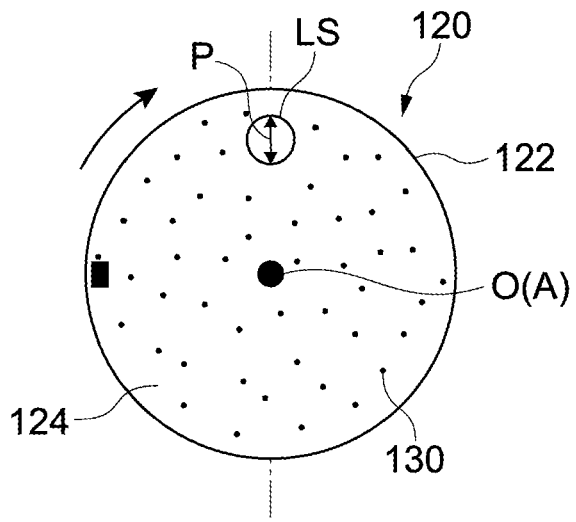
FIGS. 7A, 7B, and 7C are schematic diagrams each showing an operation of the phosphor wheel according to the embodiment.
Figure 7B:
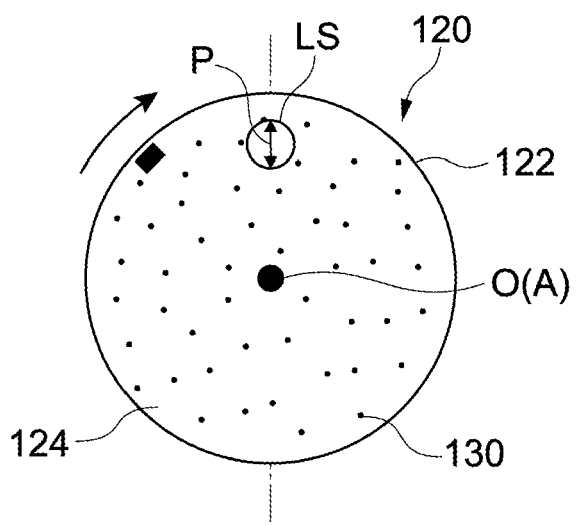
Figure 7C:
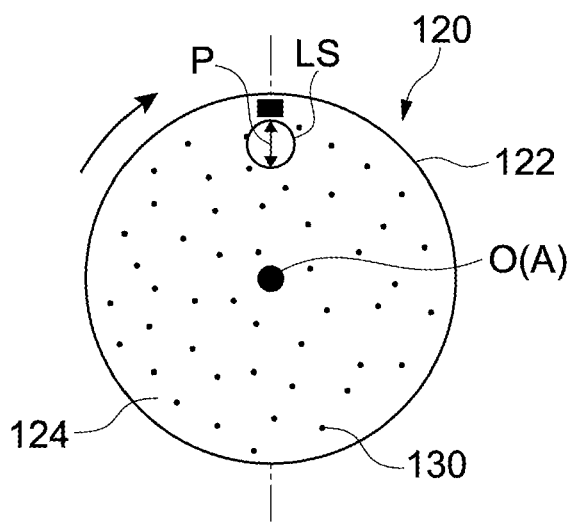

FIGS. 7A, 7B, and 7C are schematic diagrams each showing an operation of the phosphor wheel 120 according to this embodiment. As described above, the direction of the crystal axis 130 of the crystalline member that is to be the base unit 122 is set to the direction of the rotation axis O, that is, a direction parallel to the direction of the optical axis A (i.e., direction perpendicular to the plane of FIG. 7). The blue laser light B1 is output as excitation light from the light source unit 112 to the base unit 122. The blue laser light B1 is output with its polarization direction being fixed (being fixed to the polarizing axis P).

During the application of the blue laser light B1 to the light application spot LS, the phosphor wheel 120 constantly rotates about the rotation axis O. Along with this rotation, the light application spot LS to which the blue laser light B1 is applied relatively moves about the rotation axis O. In the phosphor wheel 120 according to this embodiment, the direction of the crystal axis 130 of the crystalline member used as the base unit 122 is set to a direction parallel to the rotation axis O. So, even when the base unit 122 rotates, the extending direction of the crystal axis 130 seen from the rotation axis direction does not change. Consequently, even when the phosphor wheel 120 rotates, an angle θ formed by the polarizing axis P of the blue laser light B1 and the crystal axis 130 of the base unit 122 in the light application spot LS does not change.

For example, even in the states shown in FIG. 7A, FIG. 7B, and FIG. 7C, the angle θ formed by the polarizing axis P of the blue laser light B1 and the crystal axis 130 of the base unit 122 in the light application spot LS is constantly fixed. So, even when the phosphor wheel 120 rotates, the angle θ formed by the polarizing axis P and the crystal axis 130 does not change. As a result, the disturbances of the polarization direction of the blue laser light B1 that passes through the rotating base unit 122 do not occur. Consequently, the problems of the deterioration of the polarization conversion element 172 and the like as described above can be prevented from occurring.

Hereinabove, in the image display apparatus 500 and the light source apparatus 100 according to this embodiment, the direction of the crystal axis 130 of the crystalline member that supports the phosphor layer 121 is set to a direction parallel to the optical axis direction of the blue laser light B1 serving as output light applied to the phosphor layer 121. This can sufficiently suppress the occurrence of the disturbances of the polarization direction of the blue laser light B1, even when the base unit 122 containing the crystalline member rotates.

As disclosed in Japanese Patent Application Laid-open No. 2012-173593 described above, with the configuration in which light is applied to a predetermined position of a phosphor wheel while the phosphor wheel is rotated, the phosphor wheel can be cooled to some extent. This is because the following three effects are promising: an effect of diffusing heat because the area of the phosphor wheel is sufficiently large with respect to an application area of laser light; an effect of successively changing the application position by the rotation of the phosphor wheel and thus shortening time to apply the laser light to a specific location of the phosphor; and an effect of cooling the whole of the wheel by the rotation of the phosphor wheel. Further, in the case where the application amount of the laser light is further increased in order to improve the output of the light source apparatus, it is desirable to improve cooling performance more. In this regard, a method of using a crystalline material such as crystal and sapphire as a base unit of the phosphor wheel is conceived. The crystalline material is, for example, crystal having a coefficient of thermal conductivity of about 5 to 9 W/m·K or sapphire having a coefficient of thermal conductivity of about 42 W/m·K, which have a higher coefficient of thermal conductivity than general optical glass having a coefficient of thermal conductivity of about 0.9 to 1.1 W/m·K. However, in the case where such a crystalline member is used, there arises a problem of the disturbances of the polarization direction of the output light, which are cause by the rotation of the phosphor wheel.

In the embodiment of present disclosure, the crystal axis direction of the crystalline member that is used as the base unit 122 of the phosphor wheel 120 is appropriately defined. This allows the disturbances of the polarization direction of the blue laser light B1 to be suppressed and can achieve the light source apparatus 100, which can solve the various problems caused by the disturbances of the polarization direction. For example, as described above, the lifetime of the polarization conversion element 172 and the like can be prolonged. As a result, the lifetime of the light source apparatus 100 and the image display apparatus 500 can also be prolonged.

It should be noted that the technique of suppressing the disturbances of the polarization direction of the blue laser light B1 along with the rotation of the phosphor wheel 120 is not limited to the case as described above in which the crystal axis direction of the crystalline member is set to the direction parallel to the optical axis direction of the blue laser light B1. In other words, the crystal axis direction of the crystalline member that supports the phosphor layer 121 only has to be set at least to a direction different from the direction orthogonal to the optical axis direction of the blue laser light B1. The use of the crystalline member in which the direction of the crystal axis is set as described above can suppress the disturbances of the polarization direction of the blue laser light B1, which are caused by the rotation, more than the phosphor wheel 920 described as a comparative example shown in FIGS. 6A to 6C.

Figure 8:
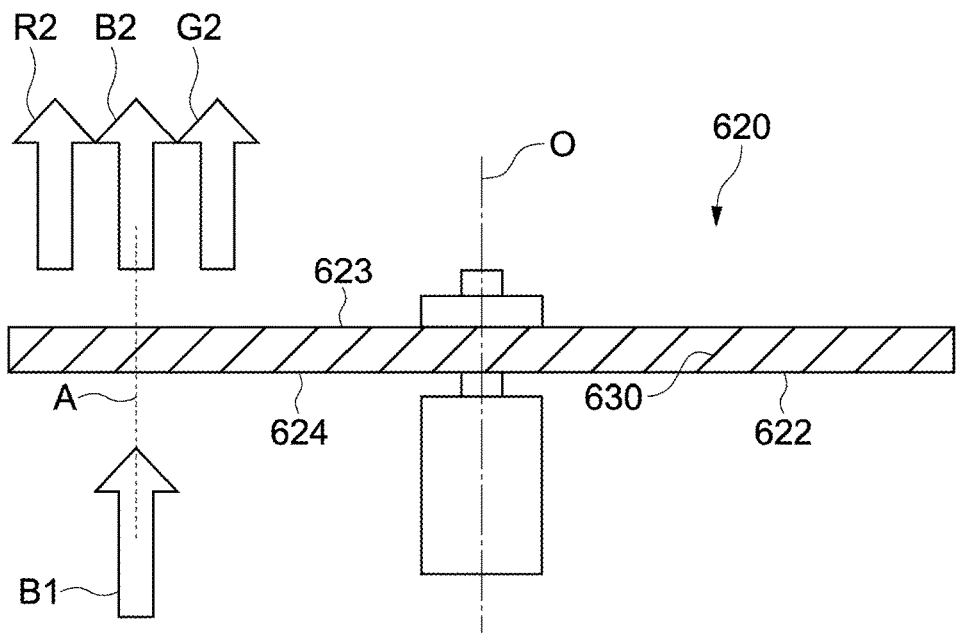
FIG. 8 is a schematic diagram showing a configuration example of a phosphor wheel according to another embodiment of the present disclosure.

FIG. 8 is a schematic diagram showing a configuration example of a phosphor wheel 620 according to another embodiment of the present disclosure. As shown in FIG. 8, in the phosphor wheel 620, the direction of a crystal axis 630 of a base unit 622 made of a crystalline member is set to a direction obliquely crossing the direction of the rotation axis O of the phosphor wheel 620 at a predetermined angle. The direction of the rotation axis O is parallel to the direction of the optical axis A of the blue laser light B1 output from the light source unit 112, and thus it can be said that the direction of the crystal axis 630 is set to a direction obliquely crossing the optical axis direction of the blue laser light B1 at a predetermined angle. Further, from a different perspective, it can also be said that the direction of the crystal axis 630 is set to a direction obliquely crossing the thickness direction of the base unit 622 at a predetermined angle.

The base unit 622 as described above can be easily prepared by, for example, using a substrate made of single crystal sapphire formed by cutting on an R surface. The substrate made of single crystal sapphire formed by cutting on the R surface is disposed such that its two main surfaces are to be a support surface 623 and a back surface 624, and thus the base unit 622 as shown in FIG. 8 can be achieved. In other words, when the R surface is disposed in the direction orthogonal to the optical axis direction of the blue laser light B1 so as to serve as a surface to which the blue laser light B1 is input, the direction of the crystal axis 630 can be set at least to a direction different form the direction orthogonal to the optical axis direction. The present disclosure is not limited thereto, and a substrate made of a crystalline member, in which the crystal axis direction is oblique to the thickness direction, may be formed by an optional method and may be used as the base unit 622.

In the case where the direction parallel to the optical axis direction is set to 0° and the direction orthogonal to the optical axis direction is set to 90°, it is thought that a greater effect of suppressing the disturbances of the polarization direction of the blue laser light B1 is exerted when the direction of the crystal axis is set to an angle closer to 0°. In the case where the performance of a light source apparatus to be manufactured is permitted to have a certain range, for example, the following light source apparatuses in which the crystal axis direction is defined in a predetermined range may be manufactured as a light source apparatus according to the embodiment of the present disclosure: a light source apparatus including a crystalline member whose crystal axis direction is set in the range from 0° to 20°; and a light source apparatus including a crystalline member whose crystal axis direction is set in the range from 10° to 30°

In the embodiment described above, the laser light source 111 is used as the solid-state light source. Since the laser light source 111 has high polarization property, the effect obtained when the disturbances of the polarization direction are suppressed is large. In other words, the amount of the laser light B1 to be input to the retardation plate 177 and the like can be sufficiently suppressed. Further, the suppression of the disturbances of the polarization direction allows the combined light, which contains the laser light B1 and visible light from the phosphor layer 121, to be output at a sufficiently high efficiency. As a result, by maintaining the polarization direction, the light source apparatus 100 with long lifetime and high efficiency can be achieved.

Further, in the embodiment described above, the blue laser light B1 is output as excitation light. In the visible light, the blue laser light B1 has a short wavelength and high energy. So, when the disturbances of the polarization property of the blue laser light B1 are suppressed, the influence caused by the disturbances of the polarization, such as the deterioration of other members, can be sufficiently suppressed. For example, the suppression of the amount of light input to the retardation plate 177 made of an organic material also provides a large effect.

Furthermore, when the crystalline member is used as the base unit, the thermal degradation of a phosphor material, which is expected to have high cooling performance as compared with other materials such as dielectric materials, can be sufficiently reduced.

<Other Embodiments>

The present disclosure is not limited to the embodiment described above and can achieve other various embodiments.

Figure 9:
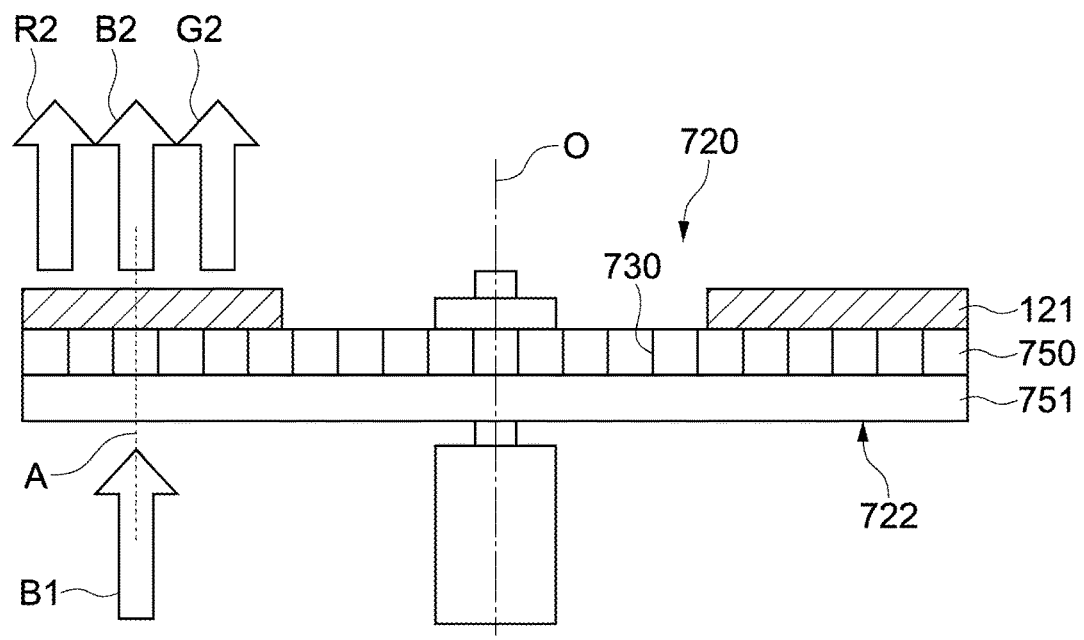
FIG. 9 is a schematic diagram showing a configuration example of a phosphor wheel according to another embodiment of the present disclosure.

FIG. 9 is a schematic diagram showing a configuration example of a phosphor wheel 720 according to another embodiment of the present disclosure. A base unit 722 of the phosphor wheel 720 includes a crystalline member 750 and a non-crystalline member 751. The crystalline member 750 supports the phosphor layer 121. The non-crystalline member 751 supports the crystalline member 750. As the non-crystalline member 751, white glass, heat-resistant glass, quartz, plastic, or the like can be used. In such a manner, a combination of the crystalline member 750 and the non-crystalline member 751 may be used as the base unit 722. For example, when crystal having an excellent coefficient of thermal conductivity and heat-resistant glass excellent in mass production are combined, a design compatible with the costs and the heat radiation property of the base unit 722 can be obtained. Further, when the direction of a crystal axis 730 of the crystalline member 750 is set to a direction parallel to the direction of the optical axis A, for example, the disturbances of the polarization direction of the blue laser light B1 can be suppressed. As a matter of course, the direction of the crystal axis 730 is not limited to the direction parallel to the optical axis direction and may be set at least to a direction different from the direction orthogonal to the optical axis direction.

Further, the crystalline member that supports the phosphor includes the form of supporting the phosphor layer formed by coating or the like on the surface and the form of dispersing the phosphor in the crystalline member. Also in such a case, when the direction of the crystal axis is appropriately defined, the disturbances of the polarization direction ca be suppressed.

Figure 10:
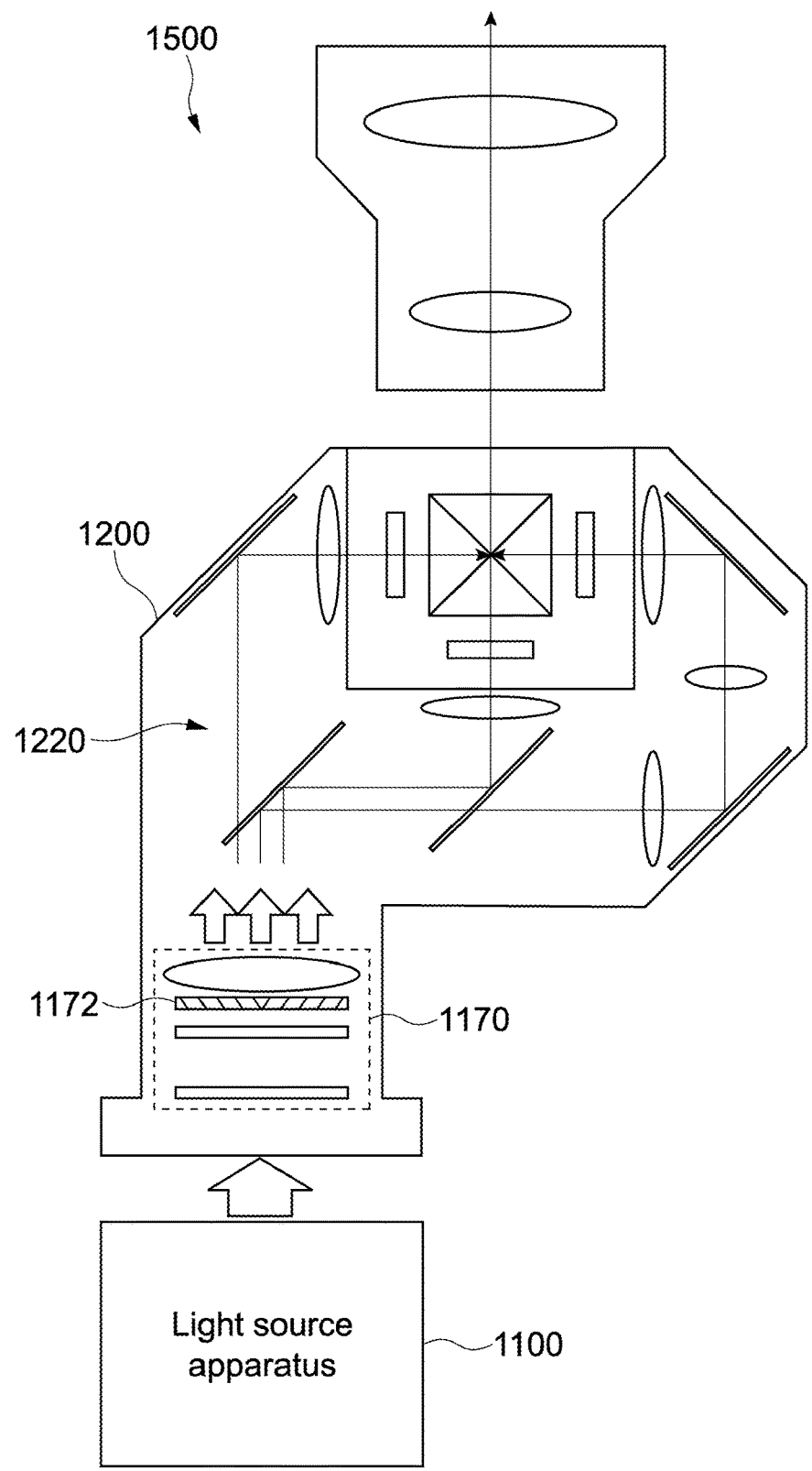
FIG. 10 is a schematic diagram showing a configuration example of an image display apparatus according to another embodiment of the present disclosure.

FIG. 10 is a schematic diagram showing a configuration example of an image display apparatus according to another embodiment of the present disclosure. In the image display apparatus 500 as shown in FIG. 1, the integrator optical system 170 including the polarization conversion element (optical element) 172 is disposed in the light source apparatus 100. Instead of such a configuration, as in an image display apparatus 1500 as shown in FIG. 10, an integrator optical system 1170 including a polarization conversion element 1172 may be disposed in a lighting optical system 1220 of an image generation system 1200. In other words, a polarization conversion element that can control the polarization direction of combined light may be incorporated in the light source apparatus or disposed as a member different from the light source apparatus. In any case, a light use efficiency can be improved, and the burden on the polarization conversion element can be mitigated. It should be noted that as the light source apparatus 1100 shown in FIG. 10, for example, an apparatus including the light collecting unit 110, the phosphor wheel 120, the lens unit 160, and the like shown in FIG. 1 is used.

Further, a unit including the phosphor layer, the phosphor wheel, and the lens unit that have been described above may be used as an optical unit according to an embodiment of the present disclosure.

In the image display apparatuses shown in FIGS. 1 and 10, the lighting optical system configured using a transmissive liquid crystal panel is described. However, the lighting optical system can also be configured using a reflective liquid crystal panel. A digital micro-mirror device (DMD) and the like may be used as the image generation element. Additionally, a polarization beam splitter (PBS), a color combining prism that combines video signals of colors of RGB, a total internal reflection (TIR) prism, and the like may be used instead of the dichroic prism. Other configurations of the image display apparatus may be appropriately set.

Of the features of the embodiments described above, at least two of the features can be combined.

It should be noted that the present disclosure can have the following configurations.

(1) A light source apparatus, including:

a light source unit including at least one solid-state light source capable of outputting light in a predetermined wavelength range as output light; and an output unit including a light emitter that is excited by the output light from the light source unit and emits visible light with a wavelength different from a wavelength of the output light, and a base unit rotatable about a predetermined rotation axis, the base unit containing a crystalline member having a crystal axis direction set to a direction different from a direction orthogonal to an optical axis direction of the output light, the light emitter being supported in the optical axis direction, the output unit being capable of outputting combined light containing the light in the predetermined wavelength range and the visible light emitted from the light emitter.

(2) The light source apparatus according to (1), in which
the crystal axis direction of the crystalline member is set to a direction parallel to the optical axis direction.

(3) The light source apparatus according to (1) or (2), in which
the crystalline member includes a C surface in the direction orthogonal to the optical axis direction, the C surface being disposed as a surface to which the output light is input.

(4) The light source apparatus according to (1), in which
the crystalline member includes an R surface in the direction orthogonal to the optical axis direction, the R surface being disposed as a surface to which the output light is input.

(5) The light source apparatus according to any one of (1) to (4), in which
the at least one solid-state light source includes a laser light source capable of outputting laser light as the output light.

(6) The light source apparatus according (5), in which
the laser light source is capable of outputting blue laser light.

(7) The light source apparatus according to any one of (1) to (6), further including an optical element capable of controlling a polarization direction of the combined light output from the output unit.

(8) The light source apparatus according to (7), in which
the light source unit is capable of outputting the output light having a first polarization direction, and
the optical element includes
a splitting element configured to split the light having the first polarization direction and light having a second polarization direction orthogonal to the first polarization direction, and
a conversion element configured to convert the light having the second polarization direction, the light having the second polarization direction being split by the splitting element, into the light having the first polarization direction.

(9) The light source apparatus according to any one of (1) to (8), in which
the crystalline member includes one of crystal and sapphire.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus, comprising:
a light source unit including at least one solid-state light source that outputs in an optical axis direction light in a predetermined wavelength range as output light; and
an output unit including
a light emitter that is excited by the output light from the light source unit and emits visible light with a wavelength different from a wavelength of the output light,
a base unit that supports the light emitter and comprises a crystalline member having a crystal axis direction arranged different from a predetermined direction, wherein the predetermined direction is orthogonal to the optical axis direction, and
a rotate unit that is connected with the base unit and rotates the base unit about a rotation axis, wherein the base unit is configured to suppress disturbance of a polarization direction of the output light when the base unit is rotated by the rotate unit,
wherein the output light from the light source unit passes through the crystalline member, wherein the output unit outputs combined light containing the light in the predetermined wavelength range and the visible light emitted from the light emitter and wherein the light emitter has a ring shape centered on the rotation axis and extends continuously along a rotation direction of the base unit, around an entire circumference of the base unit.

2. The light source apparatus according to claim 1, wherein
the crystal axis direction is arranged parallel to the optical axis direction.

3. The light source apparatus according to claim 1, wherein
the crystalline member includes a C surface arranged as a surface to which the output light is input, an extending direction of the C surface being orthogonal to the optical axis direction.

4. The light source apparatus according to claim 1, wherein
the crystalline member includes an R surface arranged as a surface to which the output light is input, an extending direction of the R surface being orthogonal to the optical axis direction.

5. The light source apparatus according to claim 1, wherein
the at least one solid-state light source includes a laser light source that outputs laser light as the output light.

6. The light source apparatus according to claim 5, wherein
the laser light source outputs blue laser light.

7. The light source apparatus according to claim 1, further comprising an optical element that controls a polarization direction of the combined light output from the output unit.

8. The light source apparatus according to claim 7, wherein
the light source unit outputs the output light having a first polarization direction, and
the optical element includes
a splitting element configured to split the light having the first polarization direction and light having a second polarization direction orthogonal to the first polarization direction, and
a conversion element configured to convert the light having the second polarization direction, the light having the second polarization direction being split by the splitting element, into the light having the first polarization direction.

9. The light source apparatus according to claim 1, wherein
the crystalline member includes one of crystal and sapphire.

10. An image display apparatus, comprising:
(a) a light source apparatus including
a light source unit including at least one solid-state light source that outputs in an optical axis direction light in a predetermined wavelength range as output light, and
an output unit including
a light emitter that is excited by the output light from the light source unit and emits visible light with a wavelength different from a wavelength of the output light, a base unit that supports the light emitter and comprises a crystalline member having a crystal axis direction arranged different from a predetermined direction, wherein the predetermined direction is orthogonal to the optical axis direction, and
a rotate unit that is connected with the base unit and rotates the base unit about a rotation axis, wherein the base unit is configured to suppress disturbance of a polarization direction of the output light when the base unit is rotated by the rotate unit,
wherein the output light from the light source unit passes through the crystalline member, wherein the output unit outputs combined light containing the light in the predetermined wavelength range and the visible light emitted from the light emitter and wherein the light emitter has a ring shape centered on the rotation axis and extends continuously along a rotation direction of the base unit, around an entire circumference of the base unit;
(b) an image generation system including
an image generation element configured to generate an image based on applied light, and
a lighting optical system configured to apply the combined light output from the light source apparatus to the image generation element; and
(c) a projection system configured to project the image generated by the image generation element.

11. The image display apparatus according to claim 10, wherein
the lighting optical system of the image generation system includes an optical element that controls a polarization direction of the combined light output from the light source apparatus.

12. An optical unit, comprising:
a light emitter that is excited by output light from at least one solid-state light source that outputs in an optical axis direction light in a predetermined wavelength range as output light and emits visible light with a wavelength different from a wavelength of the output light;
a base unit that supports the light emitter and comprises a crystalline member having a crystal axis direction arranged different from a predetermined direction, wherein the predetermined direction is orthogonal to the optical axis direction;
a rotate unit that is connected with the base unit and rotates the base unit about a rotation axis, wherein the base unit is configured to suppress disturbance of a polarization direction of the output light when the base unit is rotated by the rotate unit; and
a lens unit that outputs combined light containing the light in the predetermined wavelength range and the visible light emitted from the light emitter, wherein the output light from the at least one solid-state light source passes through the crystalline member and wherein the light emitter has a ring shape centered on the rotation axis and extends continuously along a rotation direction of the base unit, around an entire circumference of the base unit.

13. The light source apparatus according to claim 1, wherein the light emitter is arranged in the optical axis direction.

14. The light source apparatus according to claim 1, wherein the rotation axis direction is parallel to the optical axis direction.

15. The light source apparatus according to claim 1, wherein the output light output by the light source irradiates the light emitter through the base unit.

16. The light source apparatus according to claim 3, wherein the crystal axis is a C axis, and the predetermined direction is orthogonal to the C axis direction and is parallel to the extending direction of the C surface.

* * * * *